United States Patent
Kasahara et al.

[11] 4,159,166
[45] Jun. 26, 1979

[54] BEAM SPLITTING LENS ASSEMBLY

[75] Inventors: Nobuo Kasahara; Hiroyoshi Funato, both of Tokyo, Japan

[73] Assignee: Ricoh Company, Ltd., Tokyo, Japan

[21] Appl. No.: 787,411

[22] Filed: Apr. 14, 1977

[30] Foreign Application Priority Data

Apr. 19, 1976 [JP] Japan .................. 51/44826
Apr. 19, 1976 [JP] Japan .................. 51/44827

[51] Int. Cl.² .................. G02B 9/34; G02B 9/60; G02B 13/24; G02B 5/20
[52] U.S. Cl. .................. 350/196; 350/202; 350/216; 350/220; 355/4
[58] Field of Search .......... 350/202, 216, 220, 195, 350/196, 199

[56] References Cited

U.S. PATENT DOCUMENTS

| | | | |
|---|---|---|---|
| 3,858,046 | 12/1974 | Cullbalchini | 350/199 |
| 3,897,138 | 7/1975 | Kano | 350/216 |
| 3,941,457 | 3/1976 | Kawakami | 350/220 |

OTHER PUBLICATIONS

Potter; R. J.; "Multichannel Flying Spot Scanner", *IBM Technical Disclosure Bulletin*, vol. 6, No. 6, Nov. 1963.

*Primary Examiner*—Conrad J. Clark
*Attorney, Agent, or Firm*—Frank J. Jordan

[57] ABSTRACT

Two lens groups are arranged symmetrically on opposite sides of a mirror which may be a half-mirror or a dichroic mirror. The mirror is oriented perpendicular to the optical axis of the lens groups. A light image incident on the lens assembly at an angle to the optical axis is split into two beams, one beam being transmitted through the mirror and the other being reflected by the mirror. The refraction of the two beams is the same since the reflected beam passes through the front lens group twice. Where the mirror is dichroic the beams constitute color components of the light image above and below the cutoff wavelength of the dichroic mirror.

3 Claims, 5 Drawing Figures

BEAM SPLITTING LENS ASSEMBLY

BACKGROUND OF THE INVENTION

The present invention relates to a beam splitting lens assembly especially suited for color electrostatic photography, facsimile reading and the like.

In an electrostatic copying machine to which the present lens assembly is particularly suited, a light image of an original document is split into three beam components of primary colors and radiated onto three respective charged photoconductive drums. Toner substances of colors complementary to said primary colors are applied to the drums to form toner images thereon. The toner images are sequentially transferred to a copy sheet in proper register to form a colored reproduction of the original document.

Such color electrostatic copying machines are, however, far from perfection. A problem which has remained heretofore unsolved is in the configuration of the optical system for imaging the three drums. Prior art optical systems generally comprise complicated and bulky arrangements of beam splitting mirrors and color filters which are expensive to produce on a commercial production basis and preclude reduction of size of the copying machine below a certain level. The various beam splitting mirrors and color filters have large surface areas and must be precision ground to provide freedom from distortion. They also absorb an undesirably large proportion of the light incident thereon. In addition, these elements are generally individually mounted which requires precision alignment. Such individually mounted elements are also sensitive to vibration which produces copies having images which are out of focus.

SUMMARY OF THE INVENTION

In accordance with the present invention, a beam splitting lens assembly comprises two lens groups which are arranged symmetrically on opposite sides of a mirror which may be a half-mirror or a dichroic mirror. The mirror is oriented perpendicular to the optical axis of the lens groups. A light image incident on the lens assembly at an angle to the optical axis is split into two beams, one beam being transmitted through the mirror and the other being reflected by the mirror. The refraction of the two beams is the same since the reflected beam passes through the front lens group twice. Where the mirror is dichroic, the beams constitute color components of the light image above and below the cutoff wavelength of the dichroic mirror.

It is an object of the present invention to provide a beam splitting lens assemby which combines a converging lens means and a half-mirror or dichroic mirror in an integral arrangement for splitting an incident light image into two beams which are equally refracted.

It is another object of the present invention to provide a beam splitting lens assembly for an electrostatic copying machine or the like which enables a reduction in the overall size of an optical system in which the lens assembly is incorporated.

It is another object of the present invention to provide a beam splitting lens assembly which integrally mounts various lenses and a beam splitting mirror so as to reduce the sensitivity to misalignment and vibration thereof.

It is another object of the present invention to provide a beam splitting lens assembly which comprises a beam splitting mirror disposed between two symmetrical lens groups whereby the size of the mirror is minimized.

It is another object of the present invention to provide a beam splitting lens assembly of substantially reduced optical absorptivity.

It is another object of the present invention to provide a generally improved beam splitting lens assembly.

Other objects, together with the foregoing, are attained in the embodiments described in the following description and illustrated in the accompanying drawing.

DESCRIPTION OF THE PREFERRED EMBODIMENTS

While the beam splitting lens assembly of the invention is susceptible of numerous physical embodiments, depending upon the environment and requirements of use, substantial numbers of the herein shown and described embodiments have been made, tested and used, and all have performed in an eminently satisfactory manner.

A half-mirror is herein assumed to mean a mirror which reflects a portion of incident light and transmits, except for a small amount of light which is absorbed by the mirror, the remainder of the light therethrough. Whereas generally equal portions of the incident light are reflected and transmitted respectively, the term half-mirror is not taken to be so restrictive but to designate a mirror which splits an incident light beam into reflected and refracted beams which may or may not be equal in intensity. A half-mirror is typically formed by coating a glass plate with a metallic or non-metallic material, the chemical composition and thickness of which are selected to provide partial reflection and partial transmission.

Figure 1:
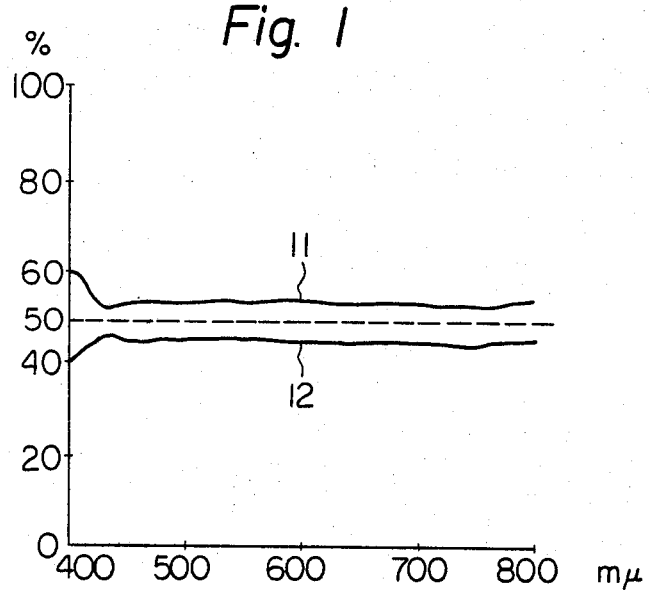
FIG. 1 is a graph illustrating the characteristics of a half-mirror utilized in the present invention.

The optical characteristics of such a half-mirror are illustrated in FIG. 1 in which a curve 11 indicates the amount of light transmitted therethrough as a function of wavelength. A curve 12 similarly indicates the reflected portion. It will be seen that the half-mirror reflects and transmits approximately equal amounts of the incident light and that the optical characteristics are substantially independent of wavelength.

Figure 2:
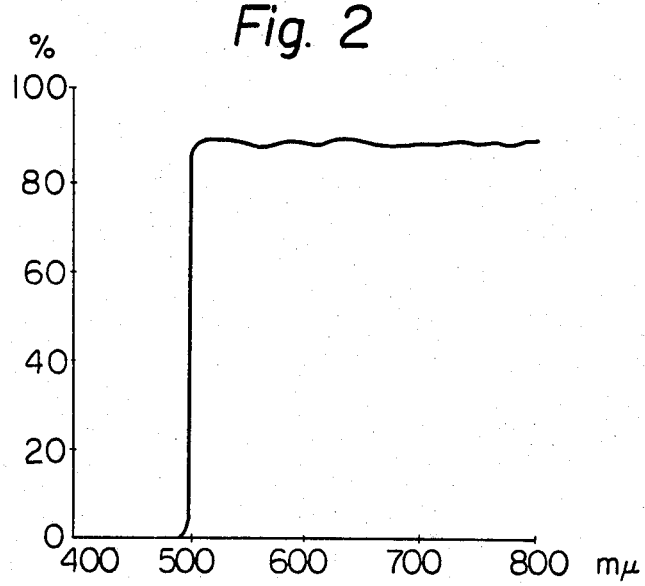
FIG. 2 is a graph illustrating the characteristics of a dichroic mirror utilized in an alternative form of the present invention.

A dichroic mirror is formed by the evaporation of a number of layers of material having different refractive indexes on a plate of glass or the like. The single curve of FIG. 2 illustrates the optical characteristics of such a dichroic mirror at an incident angle of 45°. The curve indicates the amount of light transmitted through the mirror. It will be seen that at wavelengths below 500 mm virtually all light is reflected and that at wavelengths above 500 mm virtually all light is transmitted through the dichroic mirror. The curve of FIG. 2 is exemplary only. The cutoff wavelength of a dichroic mirror can be made practically any desired value through variation of the chemical and structural composition of the refractive layers.

Figure 3:
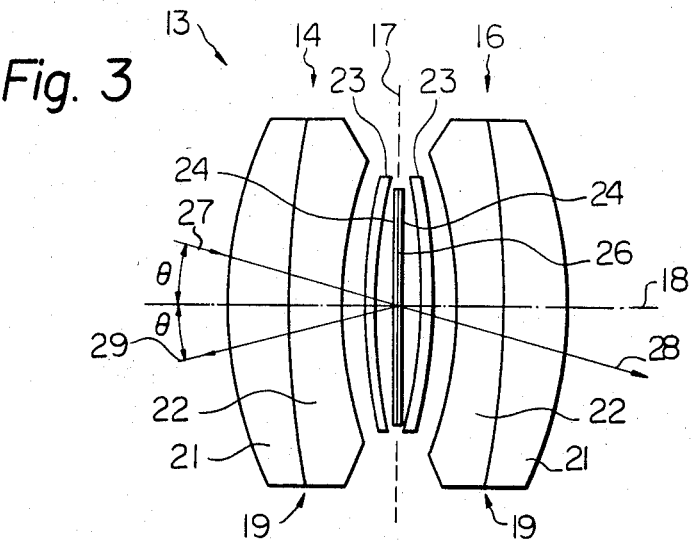
FIG. 3 is an optical diagram of a first embodiment of a beam splitting lens assembly according to the present invention.

FIG. 3 illustrates a lens assembly of the present invention which is generally designated by the reference numeral 13 and comprises first and second lens groups 14 and 16 respectively which are provided in a symmetrical arrangement on opposite sides of a plane 17. The optical axis of the lens assembly 13 is perpendicular to the plane 17 and is designated as 18. The lens groups 14 and 16 comprise identical elements which are designated by the same reference numerals. Each lens group 14 and 16 comprises, inversely spaced from the plane 17, a doublet lens 19 consisting of a first lens 21 and a second lens 22 which are cemented together. The lens groups 14 and 16 further each comprise a third lens 23 and a transparent glass plate 24. A suitable partially reflective material 26 is coated on one of the plates 24 and the plates 24 are then sandwiched together with the reflective material 26 therebetween to form, as desired, a half-mirror or a dichroic mirror. If desired, one of the plates 24 may be omitted and the reflective material 26 formed on one surface of the other plate 24. In critical applications, this introduces asymmetry into the configuration due to the refractive index of the plate 24. The effect is cancelled by using two plates 24. However, in non-critical applications in which the plate thickness is less than 2-3 mm only one plate 24 may be used.

The lens assembly 13 functions as follows. A light image or incident beam of light is radiated onto the lens assembly 13 at an angle $\theta$ to the optical axis 18 as designated by 27. A first portion or beam of this incident beam 27 is transmitted through the mirror material 26 as indicated by 28. A second portion or beam is reflected from the mirror material 26 as indicated by 29. The beam 28 is refracted by the lens group 16 and propogates rightwardly as illustrated. The beam 29 is refracted by the lens group 14 and propogates leftwardly.

In accordance with an important feature of the present invention the beams 28 and 29 are refracted equally since the lens groups 14 and 16 are symmetrical and the beam 29 is refracted twice by the lens group 14. In other words, the incident beam 27 is refracted once by the lens group 14 prior to incidence on the mirror material 26. The beam 28 is subsequently refracted once by the lens group 16 and the beam 29 is subsequently refracted once by the lens group 14. Both beams 28 and 29 are refracted twice by optically equivalent lens groups.

Although many arrangements of the lens groups 14 and 16 may be provided within the scope of the present invention depending on the environment and requirements of use, a particular configuration of the lens assembly 13 which has proven especially advantageous in practical application is defined below.

| f = 230 mm | F / 5.6 | | |
|---|---|---|---|
| (mm) | (mm) | | |
| V1 = 52.785, | d1 = 12.929, | n1 = 1.63854, | $v_1$ = 55.5 |
| V2 = 180.012, | d2 = 4.241, | n2 = 1.58267, | $v_2$ = 46.5 |
| V3 = 39.4143, | d3 = 3.534 | | |
| V4 = 56.557, | d4 = 7.486, | n3 = 1.56883, | $v_3$ = 56.0 |
| V5 = 84.235, | d5 = 3.473 | | |
| V6 = $\infty$, | d6 = 2.000, | n7 = 1.5231, | $v_7$ = 58.8 | f is a focal length of the lens assembly 13 and F is a relative aperture of the lens assembly 13. $V_1$ and $V_2$ are radii of curvature of faces of the first lens element 21 remote and adjacent to the reflective material 26 respectively. $V_3$ is a radius of curvature of a face of the second lens element 22 adjacent to the reflective material 26. $V_4$ and $V_5$ are radii of curvature of faces of the third lens element 23 remote and adjacent to the reflective material 26 respectively. $V_6$ is a radius of curvature of the plate 24. $d_1$ and $d_2$ are thicknesses of the first and second lens elements 21 and 22 respectively at the optical axis 18. $d_3$ is a spacing between the second and third lens elements 22 and 23 at the optical axis 18. $d_4$ is a thickness of the third lens element 23 at the optical axis 18. $d_5$ is a spacing between the third lens element 23 and the plate 24 at the optical axis 18. $d_6$ is a thickness of the plate 24. $n_1$, $n_2$, $n_3$ and $n_7$ are refractive indexes of the first, second and third lens elements and the plate 21, 22, 23 and 24 respectively. $V_1$, $V_2$, $V_3$ and $V_7$ are Abbe numbers of the first, second and third lens elements and the plate 21, 22, 23 and 24 respectively.

Figure 4:
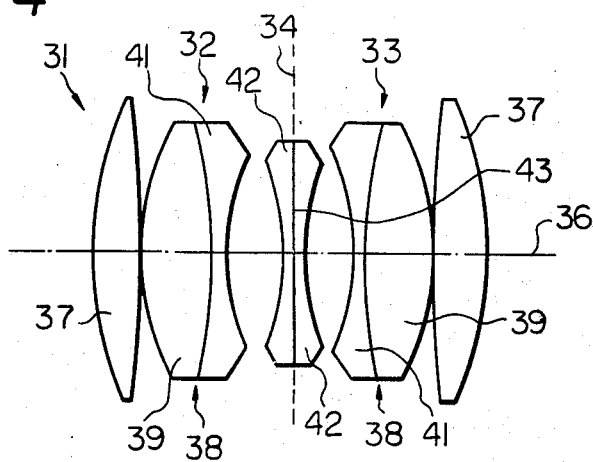
FIG. 4 is similar to FIG. 3 but shows a second embodiment of the present invention.

FIG. 4 illustrates another lens assembly 31 embodying the present invention. The lens assembly 31 comprises first and second lens groups 32 and 33 respectively which are symmetrically arranged on opposite sides of a plane 34. The optical axis of the lens assembly 31 is designated as 36, and is perpendicular to the plane 34. Each lens group 32 and 33 comprises a first lens element 37 which is plano or double convex, a doublet lens 38 comprising second and third lens elements 39 and 41 respectively and a fourth lens element 42. The second lens element 39 is double convex. The third lens element 41 is double concave and is cemented to the second lens element 39. The fourth lens element 42 is plano-convex. A partially reflective material 43 is sandwiched between the adjacent planar faces of the lens elements 42 in a manner similar to the plates 24.

Many configurations of the present invention are possible within the scope thereof, FIGS. 3 and 4 being exemplary only. It is advantageous in some applications for the lens assembly to refract the transmitted and reflected beams by the same amount. This is accomplished by making the lens groups symmetrical. However, the lens groups may be made asymmetrical where it is desired to provide different degrees of refraction for the transmitted and reflected beams.

Figure 5:
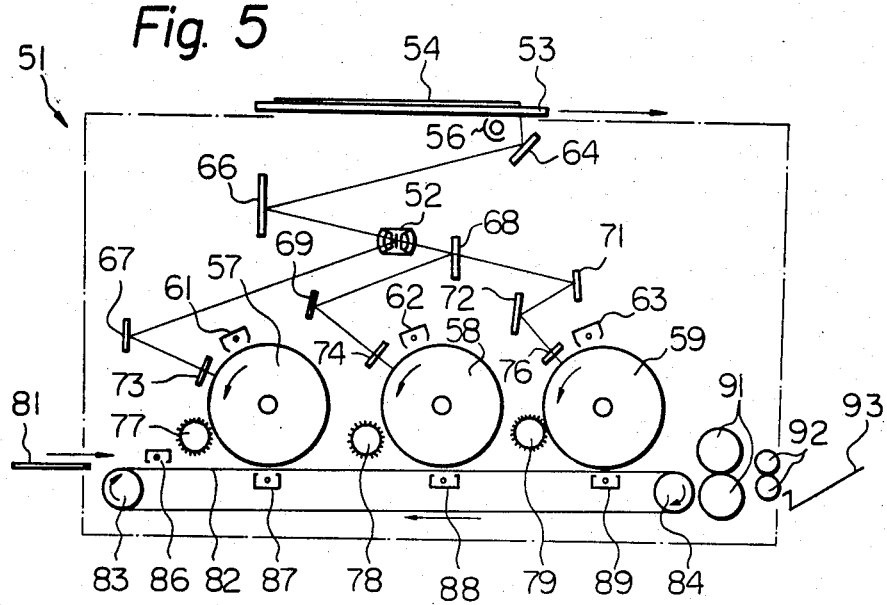
FIG. 5 is a schematic view of a color electrostatic copying machine in which the present invention is advantageously incorporated.

FIG. 5 illustrates a color electrostatic copying machine 51 which utilizes a beam splitting lens assembly 52 of the present invention. The lens assembly 52 may correspond to the particular configurations of FIGS. 3 or 4 or may differ therefrom in the manner described hereinabove.

The copying machine 51 further comprises a glass platen 53 which supports an original document 54 for electrostatic reproduction face down. A lamp 56 illuminates the document 54 from below. Three photoconductive drums 57, 58 and 59 are electrostatically charged by corona charging units 61, 62 and 63 respectively. A light image of the portion of the document 54 immediately above the lamp 56 is reflected from a mirror 64 to a mirror 66 from which the image is reflected to the lens assembly 52 at an angle to the optical axis thereof. The image is split and refracted by the lens assembly 52 into a reflected beam which is reflected to a mirror 67 and a transmitted beam which propogates to a mirror 68. Where the lens assembly 52 is provided with a half-mirror, the mirror 68 is also a half-mirror. The beam incident on the half mirror 68 is again split into a beam which is reflected to a mirror 69 and a beam which is transmitted to a mirror 71. From the mirror 71, the beam is reflected to a mirror 72.

From the mirrors 67, 69 and 72 the respective image components or beams are reflected through blue, green and red filters 73, 74 and 76 onto the drums 57, 58 and 59 respectively. These image components or beams cause localized photoconduction of the drums to form electrostatic images thereon corresponding to the respective primary color components passed through the filters. The platen 53 and document 54 are moved rightwardly at the same surface speed as the drums 57, 58 and 59 so that the entire document 54 is scanned and complete electrostatic images thereof formed on the drums.

After exposure, developing units symbolically shown as magnetic brushes 77, 78 and 79 apply yellow, magenta and cyan toner substances to the drums 57, 58 and 59 to form colored toner images corresponding to these complimentary primary colors thereon. A copy sheet 81 is fed rightwardly onto a conveyor belt 82 which is drivingly trained around rollers 83 and 84. A charger 86 applies an electrostatic charge to the copy sheet 81 which causes the same to stick to the conveyor belt 82. As the copy sheet 81 passes under and in light contact with the drums 57, 58 and 59 transfer charges 87, 88 and 89 apply electrostatic charges through the belt 82 which cause the toner images to be transmitted from the drums to the copy sheet 81. The rotational speeds of the drums 57, 58 and 59 and the belt 82 are precisely synchronized so that the toner images will be transferred to the copy sheet 81 in register. After transfer the toner images are fixed to the copy sheet 81 by heated transfer rollers 91. The completed copy is then fed by discharge rollers 92 into a receiving tray 93. Although not shown, means are provided to discharge and remove residual toner substance from the drums 57, 58 and 59 after transfer.

Where the lens assembly 52 is provided with a dichroic mirror, the filters 73, 74 and 76 may be omitted. The cutoff wavelength of the dichroic mirror in the lens assembly 52 is selected to reflect blue light and transmit green and red. In this case, the mirror 68 is also a dichroic mirror which is adapted to reflect green and transmit red. Thus, the same effect is produced with a simplified arrangement and less loss of light.

In summary, it will be seen that the present lens assembly serves as a through-lens, an in-mirror lens and/or a color filter as desired and eliminates the need for separate components in an optical system for a color electrostatic copying machine or the like. Due to the integral arrangement of components, the need for precise alignment and anti-vibration mounting of separately mounted components is eliminated. Since the beam splitting mirror of the present lens assembly is provided between two symmetrical lens groups, it may be made of minimum size thereby effecting considerable economies in commerical production. Where the beam splitting mirror is a dichroic mirror, color filters are eliminated in a color electrostatic copying machine thereby reducing light loss and distortion to a very large extent.

Many modifications will become possible for those skilled in the art after receiving the teachings of the present disclosure without departing from the scope thereof. In addition, although the present lens assembly is particularly suited for, and shown and described as incorporated into a color electrostatic copying machine, its utility is not so limited. Another application for which the present lens assembly is admirably suited is in the reading section of a color facsimile system. In the copying machine 51 shown in FIG. 5, the document 54 may be held stationary and the mirrors 64 and 66 moved for scanning if desired.

What is claimed is:

1. A beam splitting lens assembly comprising a converging lens means, a plane beam splitting mirror means oriented perpendicular to an optical axis of the lens means, the lens means comprising first and second lens groups provided in symmetrical arrangement on opposite sides of the mirror means respectively, each of the first and second lens groups comprising a transparent plate, the mirror means comprising a partially reflective material sandwiched between the plates of the first and second lens groups respectively, each of the first and second lens groups further comprising a doublet lens consisting of first and second lens elements and a third lens element, the first, second and third lens elements and the transparent plate of each of the first and second lens groups being defined as follows:

| $f = 230$ mm | $F / 5.6$ | | |
|---|---|---|---|
| $V_1 = 52.785$, | $d_1 = 12.929$, | $n_1 = 1.63854$, | $v_1 = 55.5$ |
| $V_2 = 180.012$, | $d_2 = 4.241$, | $n_2 = 1.58267$ | $v_2 = 46.5$ |
| $V_3 = 39.4143$, | $d_3 = 3.534$ | | |
| $V_4 = 56.557$, | $d_4 = 7.486$ | $n_3 = 1.56883$, | $v_3 = 56.0$ |
| $V_5 = 89.235$, | $d_5 = 3.473$ | | |
| $V_6 = \infty$, | $d_6 = 2.000$, | $n_7 = 1.5231$, | $v_7 = 58.8$ | where f is the focal length of the lens assembly and F is the relative aperture of the lens assembly, $V_1$ and $V_2$ are radii of curvature of faces of the first lens element remote and adjacent to the reflective material respectively, $V_3$ is the radius of curvature of a face of the second lens element adjacent to the reflective material, $V_4$ and $V_5$ are radii of curvature of faces of the third lens element remote and adjacent to the reflective material respectively, $V_6$ is the radius of curvature of the plate, $d_1$ and $d_2$ are thicknesses of the first and second lens elements respectively at the optical axis of the lens means, $d_3$ is the spacing between the second and third lens elements at the optical axis of the lens means, $d_4$ is the thickness of the third lens element at the optical axis of the lens means, $d_5$ is the spacing between the third lens element and the plate at the optical axis of the lens means, $d_6$ is the thickness of the plate, $n_1$, $n_2$, $n_3$ and $n_7$ are refractive indexes of the first, second and third lens elements and the plate respectively and $v_1$, $v_2$, $v_3$ and $v_7$ are Abbe numbers of the first, second and third lens elements and the plate respectively.

2. A beam splitting lens assembly as in claim 1, in which the reflective material is constituted by a dichroic layer.

3. A beam splitting lens assembly as in claim 1, in which the reflective material is constituted by a substantially half-reflecting material.

* * * * *